Figure 1:
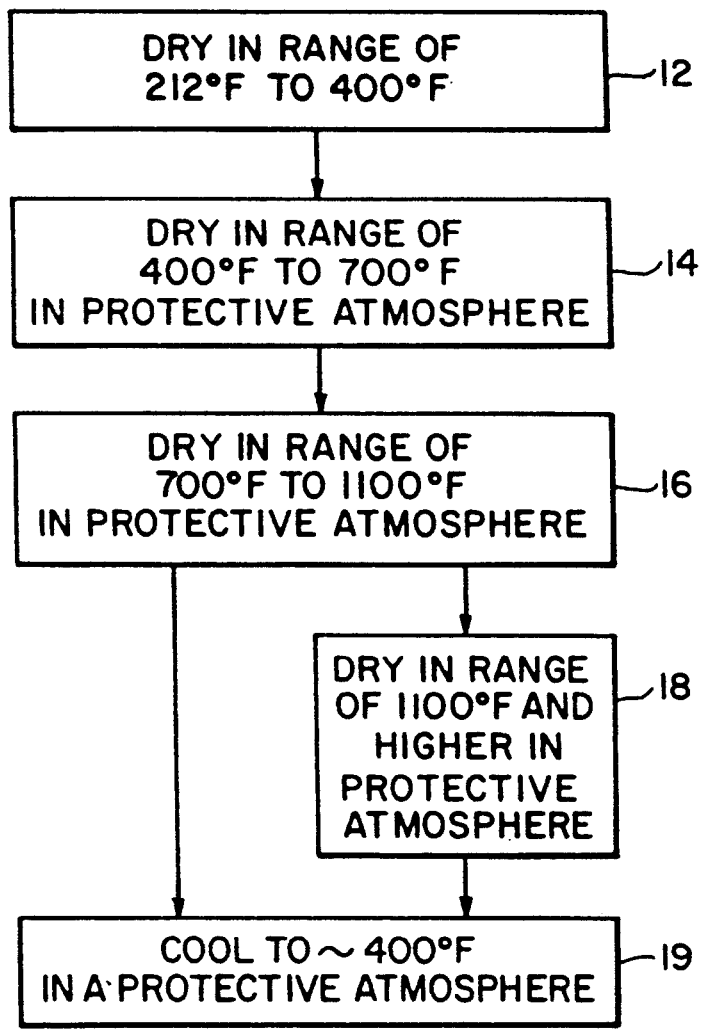

United States Patent [19]

Pollock et al.

[11] Patent Number: 5,238,667
[45] Date of Patent: Aug. 24, 1993

[54] METHOD FOR TREATING HYDRATED GREEN SALT

[75] Inventors: Eugene N. Pollock, Brookline; David S. Schlier, Gardner; George Shinopulos, Burlington, all of Mass.

[73] Assignee: Nuclear Metals, Inc., Concord, Mass.

[21] Appl. No.: 821,327

[22] Filed: Jan. 13, 1992

Related U.S. Application Data

[63] Continuation of Ser. No. 617,409, Nov. 21, 1990, abandoned, which is a continuation of Ser. No. 369,724, Jun. 22, 1989, abandoned.

[51] Int. Cl.$^5$ .................... C01G 43/06; G21C 21/00
[52] U.S. Cl. ...................... 423/259; 264/0.5
[58] Field of Search .................... 423/259; 264/0.5

[56] References Cited

U.S. PATENT DOCUMENTS

| | | | |
|---|---|---|---|
| 3,063,792 | 11/1962 | Reinhart et al. | 423/259 |
| 3,069,228 | 12/1962 | Davis et al. | 423/259 |
| 3,175,879 | 3/1965 | Townend et al. | 423/259 X |
| 3,985,551 | 10/1976 | Powell et al. | 75/84.1 R |

FOREIGN PATENT DOCUMENTS 821957 10/1959 Fed. Rep. of Germany ...... 423/259

OTHER PUBLICATIONS

Katz, J. J., Seaborg, G. T. and Moss, L. R., *The Chemistry of the Actinide Elements*, vol. 1, 2nd Edition, Chapman Hall (1986) p. 304.
Katz, J. J. and Rabinowitch, E., *The Chemistry of Uranium*, Port I., N.Y. McGraw-Hill, 1951, p. 360.
Crump, W. A. and Kennely, J. A., "Conversion of Scrap Metal to pure UF4 by Aqueous Methods" Mallinckrodt Chemical Works, MCW 1407, 1957.

*Primary Examiner*—Robert L. Stoll
*Assistant Examiner*—Matthew Zmurko
*Attorney, Agent, or Firm*—Iandiorio & Dingman

[57] ABSTRACT

A method of producing a high density, low hygroscopic green salt from hydrated green salt includes heating a charge of hydrated green salt in a nonreactive atmosphere to a first temperature above the boiling point of water to drive off free water; heating the charge in a nonreactive atmosphere to a second temperature higher than the first temperature to drive off the water of crystallization present in the green salt; heating the charge in a nonreactive atmosphere to a third temperature higher than the second temperature to induce anhygroscopicity of the charge; and cooling the charge to approximately 400° F. or less in a protective atmosphere to prevent atmospheric oxidation and hydrolysis.

19 Claims, 2 Drawing Sheets

METHOD FOR TREATING HYDRATED GREEN SALT

This is a continuation of application Ser. No. 07/617,409, filed Nov. 21, 1990, now abandoned, which is a continuation of Ser. No. 07/369,724, filed Jun. 22, 1989, now abandoned.

FIELD OF INVENTION

This invention relates to a method for producing green salt ($UF_4$) and more specifically to a method for producing high bulk density, anhydrous and anhygroscopic green salt from low bulk density hydrated green salt.

BACKGROUND OF INVENTION

Green salt ($UF_4$) is an important intermediary in the recycling of uranium scrap metal into useful uranium metal. It may be produced from uranium scrap by a hydrometallurgical process, as described in U.S. Pat. No. 4,699,769. Green salt may also be produced by the hydrogen reduction of uranium hexafluoride and the hydrofluorination of uranium dioxide. Once obtained, the green salt is subjected to a reduction reaction, with a suitable reducing agent, for example magnesium, to form magnesium fluoride and elemental uranium. Calcium or other reducing agents may likewise be used.

The presence of water or oxidation products in the green salt affects the reduction reaction in that they cause extreme propagation rates, high pressures and reaction vessel blowouts. Blowouts can cause damage to the reaction vessel and the furnace and can cause personal injury to workers. In addition, when magnesium is consumed in reaction with the contaminants, the stoichiometry of the reduction reaction is disturbed, resulting in low product yields and unacceptable side products.

The principal oxygen-containing contaminants in green salt are water, uranium dioxide ($UO_2$), (which is reported ammonium oxalate insolubles (AOI) because it is identified as an insoluble when green salt is dissolved in ammonium oxalate), and uranyl fluoride ($UO_2F_2$). The presence of water should be 0.5% by weight or less. An acceptable level of AOI is 1% by weight or less and $UO_2F_2$ should not exceed 2% by weight.

The hydrometallurgical preparation of green salt from scrap uranium entails the aqueous reaction of uranium in the plus four valence, $U+^4$, with hydrofluoric acid and is described in U.S. Pat. No. 4,699,769. The green salt product of the hydrometallurgical process is highly hydrated and must be subjected to a drying process to remove water before it may be safely subjected to magnesium reduction. This drying must be carefully performed because water can react with green salt to form uranium dioxide ($UO_2$). Further, water and oxygen can react with green salt to form uranyl fluoride ($UO_2F_2$). In addition to forming these oxygen-containing contaminants in the green salt, the reaction of water during the magnesium reduction process releases hydrogen gas, which presents a serious explosion hazard. The green salt preparer is therefore faced with a dilemma: drying the green salt at lower temperatures with the likelihood that drying will be inadequate and an excess of water will remain in the green salt, or drying at higher temperatures at which hydrolysis may take place, resulting in oxygen-containing contaminants.

Free water may be driven off hydrated green salt in air at temperatures up to approximately 400° F. However, at this temperature the green salt still contains a significant amount of water of crystallization. Above approximately 400° F., the water of crystallization may be driven off, but a protective atmosphere is needed to prevent oxidation of the green salt by oxygen in the air. In the past, green salt has been dried in protective or non-reactive atmospheres to an anhydrous state, but typically has been low in density and highly hygroscopic. Therefore, even when dried, hydrometallurgical green salt required special handling before the magnesium reduction processing stage to prevent re-hydration by atmospheric moisture.

Anhydrous green salt may be prepared from uranium dioxide by hydrofluorination at elevated temperature in the absence of water. The resulting water vapor may be removed from the reaction chamber and the product green salt is known to be anhygroscopic and to be of high bulk density. This green salt is free of water and offers the advantage of processing well upon reduction and of not requiring special handling since it is anhygroscopic and therefore absorbs virtually no water on exposure to air. Hydrofluorinated green salt, however, is difficult to prepare because of the highly corrosive and toxic nature of hydrogen fluoride, which is exacerbated by the elevated temperature at which the green salt is prepared.

Anhydrous anhygroscopic green salt may also be prepared pyrometallurgically by the hydrogen reduction of uranium hexafluoride.

To take advantage of these dry green salt processes for the purpose of obtaining anhydrous, anhygroscopic, high density green salt, the proper starting materials, uranium dioxide and uranium hexafluoride, must first be produced, making these processes highly inefficient given scrap uranium metal and alloys as starting materials. Therefore, the efforts of scrap uranium processors have focused on treating hydrated green salt rather than producing hydrofluorinated or pyrometallurgical green salt.

Attempts have been made to combine hydrated, hydrometallurgical green salt with pyrometallurgical green salt during the magnesium reduction process to keep the total oxygen containing contaminants to an acceptable level. It was found however that the total volume and bulk density of the mixture of the green salts could not be predicted from the volume and density of the component green salts; the actual volume and the actual density being lower than predicted. Since a specially prepared reaction chamber is required for the magnesium reduction reaction, the difference in volume and density of the hybrid green salt from prior preparations results in the variability of the charge of green salt subjected to the magnesium reduction reaction and therefore gives low product weight and substandard yields. Green salt of sufficient purity to yield a good product in the magnesium reduction reaction ("metal grade" green salt) has a bulk density of at least 2.7 grams per cubic centimeter.

SUMMARY OF INVENTION

It is therefore an object of this invention to provide a method for producing high bulk density, anhydrous anhygroscopic green salt from hydrated green salt.

It is a further object of this invention to provide a process for producing high bulk density, anhydrous anhygroscopic green salt without the need for high temperature treatment of the green salt with hydrogen fluoride.

It is a further object of this invention to provide hydrometallurgical green salt which may be stored without the need for special containers to protect it from ambient moisture.

It is a further object of this invention to provide hydrometallurgical green salt which does not require special handling before the magnesium reduction process.

It is a further object of this reaction to provide such green salt without the use of gaseous hydrogen as a reactant.

It is a further object of this invention to provide hydrometallurgical green salt which may be mixed in any quantity with pyrometallurgical green salt to form a mixture of predictable volume and bulk density and satisfactory yield.

It is a further object of this invention to provide a hydrometallurgical green salt which is anhydrous and which has acceptable quantities of AOI and uranyl fluorides.

It is a further object of this invention to provide a hydrometallurgical green salt meeting metal grade requirements.

This invention results from the discovery that when heated in a protective atmosphere at or below 700° F. hydrometallurgical green salt becomes anhydrous but remains hygroscopic, and that further heating to higher temperatures results in an increase in the bulk density and renders the green salt anhygroscopic.

This invention features a method of producing a high density, low hygroscopic green salt from hydrated green salt. A charge of hydrated green salt is heated in a nonreactive atmosphere to a first temperature above the boiling point of water to drive off free water. The charge is then heated in a nonreactive atmosphere to a second temperature higher than the first temperature to drive off the water of crystallization present in the green salt. The charge is then heated in a nonreactive atmosphere to a third temperature higher than the second temperature to induce anhygroscopicity of the charge. The charge is then cooled to approximately 400° F. or less.

In a preferred embodiment the charge may be heated before the cooling step in a nonreactive atmosphere to a fourth temperature higher than the third temperature to increase the bulk density of the charge. The nonreactive atmosphere may be a noble gas, a vacuum, hydrogen fluoride, a gaseous reducing agent, or even air. The hydrated green salt may be the product of hydrometallurgical green salt or hydrated pyrometallurgical green salt. The first temperature may be in the range of 212° F.–400° F.; the second temperature may be in the range of 400°–700° F.; the third temperature may be in the range of 700°–1100° F.; and the fourth temperature may be in a range above 1100° F. A fourth temperature of approximately 1300° F. has been used. The nonreactive atmosphere, whatever its nature, may be flowed over the green salt to carry away liberated water.

DISCLOSURE OF PREFERRED EMBODIMENT

Figure 2:
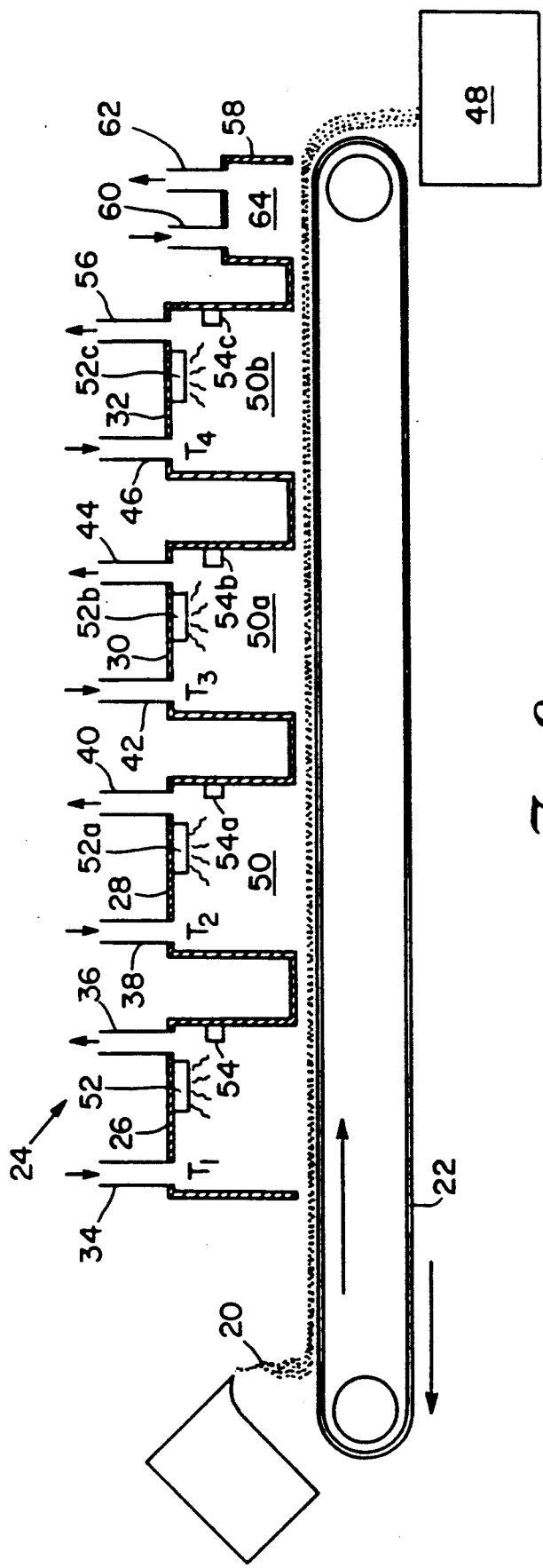

Other objects, features and advantages will occur to those skilled in the art from the following description of a preferred embodiment and the accompanying drawings, in which:

FIG. 1 is a flow chart showing a drying process, according to this invention; and FIG. 2 is a schematic plan view of a drying apparatus adapted to perform the drying process, according to this invention.

This invention may be accomplished by subjecting hydrated green salt to drying at sequentially higher temperature ranges. Water vapor may be removed as it is driven off the compound by circulating the atmosphere over the compound or by maintaining a vacuum in the drying crucible. At temperatures above approximately 400° F., a protective atmosphere should be maintained over the green salt to prevent atmospheric oxidation of the green salt. The protective atmosphere may be a noble gas, or a reducing atmosphere and should be circulated while water is being driven off the green salt. Alternatively, the protective atmosphere may be a vacuum.

There is shown in FIG. 1 process 10, according to this invention including drying the green salt in the range of 212° F. to 400° F. to remove free water in the green salt, step 12, and drying the green salt, step 14, in the range of 400° F. to 700° F. in a protective atmosphere to drive off the water of crystallization and to prevent hydrolysis and atmospheric oxidation. After this, the green salt is dried, step 16, in the range of 700° F. to 1100° F. in a protective atmosphere to induce anhygroscopicity and to prevent atmospheric oxidation. The green salt may then be cooled to approximately 400° F. or less in a protective atmosphere, step 19. Alternatively, before step 19 there may be a fourth heating step in which the green salt is dried, step 18, in the range of 1100° F. or above in a protective atmosphere to increase the bulk density of the green salt and to prevent atmospheric oxidation; the drying temperature for the fourth step 18 may be 1300° F.

There is shown in FIG. 2 an apparatus for performing the drying process according to this invention by which green salt 20 is deposited upon moving conveyor belt 22. Conveyor belt 22 moves green salt 20 through oven 24 having temperature zones 26, 28, 30 and 32. First temperature zone 26 raises the temperature of the green salt to temperature T1 which is in the range of 212° F. to 400° F. The temperature in first zone 26 may be sensed by thermostat 54 and, when necessary, heat may be added by heating unit 52 which may be, for example, an infrared heating unit responsive to thermostat 54. First zone 26 includes dry air input 34 and moist air output 36 to remove the free water as it is driven off the green salt 20. At temperatures in this range, air is relatively non-reactive with green salt and may be considered a non-reactive or protective atmosphere. Second oven zone 28 is maintained at temperature T2 which is in the range of 400° F. to 700° F. and has a non-reactive or protective atmosphere 50 which may be a noble gas, a reducing atmosphere or a vacuum. The temperature in second zone 28 may be monitored by thermostat 54$a$ and maintained by heating unit 52$a$ responsive to thermostat 54$a$. Protective atmosphere 50 is kept free of moisture by the removal of the moisture through removal port 40; if protective atmosphere 50 is not a vacuum, it may be replenished through dry atmosphere input 38. Temperature T2 is sufficient to drive off the water of crystallization present in green salt 20. At this point, the green salt is anhydrous but highly hygroscopic.

Conveyor 22 then carries green salt 20 into third oven zone 30 which is maintained at temperature T3 and encloses protective atmosphere 50$a$. The temperature in third zone 30 may be monitored by thermostat 54$b$ and maintained by heating unit 52b which is responsive to thermostat 54b. Temperature T3 may be in the range of 700° F. to 1100° F. to induce anhygroscopicity in green salt 20. Protective atmosphere 50a may, like protective atmosphere 50, be a vacuum, a noble gas, or a reducing atmosphere. Zone 30 may be provided with a dry atmosphere input 42 and atmosphere vent 44 to maintain protective atmosphere 50a in zone 30. The achievement of anhygroscopicity in the previously hydrated green salt is a crucial aspect of this invention. Previous drying techniques did not specify drying temperatures sufficient to induce anhygroscopicity, so that even when previously hydrated green salt was dried to an anhydrous condition, it required special handling before the magnesium reduction process to prevent rehydration from atmospheric moisture. This third temperature sequence, however, renders the green salt anhygroscopic, so that it does not absorb atmospheric moisture and does not require special handling.

Conveyor 22 then carries green salt 20 into fourth zone 32 which is maintained at temperature T4 in the range of 1100° F. and higher. The temperature in fourth zone 32 may be monitored by thermostat 54c and may be maintained by heating unit 52c responsive to thermostat 54c. Zone 32 also encloses protective atmosphere 50b which may be maintained through atmosphere input port 46 and output port 56. Temperature T4 is sufficient to induce an increase in the bulk density of green salt 20. Conveyor 22 then carries green salt 20 into cooling zone 58 where protective atmosphere 64 is maintained by atmosphere inlet 60 and atmosphere outlet 62, until the green salt is cooled to 400° F. or lower when it may be exposed to air without oxidation, hydrolysis, or rehydration. Finally, conveyor 22 removes green salt 20 from oven 24 and carries green salt 20 to green salt collector 48 for storage or further processing.

While FIG. 2 shows a multizone oven through which green salt is carried by a conveyor, the process according to this invention may be accomplished by other devices. For example, the hydrated green salt may be placed in a sealable oven in which the interior atmosphere may be circulated or a vacuum maintained to remove water vapor as the green salt is subjected to various temperatures and in which a protective atmosphere may be maintained in temperature ranges of 400° F. and higher. The process according to this invention may also be accomplished by other devices.

Although specific features of the invention are shown in some drawings and not others, this is for convenience only as each feature may be combined with any or all of the other features in accordance with the invention.

Other embodiments will occur to those skilled in the art and are within the following claims :

What is claimed is:

1. A method for producing green salt from hydrated green salt comprising:
   heating a charge of hydrated green salt in a non-reactive atmosphere to a first temperature above the boiling point of water to drive off free water;
   heating the charge in a non-reactive atmosphere to a second temperature higher than the first temperature to drive off the water of crystallization present in the green salt;
   heating the charge in a non-reactive atmosphere to a third temperature higher than 752° F. to induce anhygroscopicity of the charge; and
   cooling the charge to approximately 400° F. or less in a non-reactive atmosphere to prevent oxidation and hydrolysis.

2. The method of claim 1 including heating the charge in a non-reactive atmosphere to a fourth temperature higher than the third temperature before cooling the charge to increase the bulk density of the charge in which cooling the charge to approximately 400° F. or less is accomplished in a non-reactive atmosphere.

3. The method of claim 2 wherein the fourth temperature is above 1100° F.

4. The method of claim 3 wherein the fourth temperature is approximately 1300° F.

5. The method of claim 1 wherein the non-reactive atmosphere is a noble gas.

6. The method of claim 1 wherein the non-reactive atmosphere is a vacuum.

7. The method of claim 1 wherein the non-reactive atmosphere during the heating to the first temperature is air.

8. The method of claim 1 wherein the hydrated green salt is the product of hydrometallurgical green salt.

9. The method of claim 1 wherein the hydrated green salt is hydrated pyrometallurgical green salt.

10. The method of claim 1 where in the first temperature is in the range of 212° F. to 400° F.

11. The method of claim 1 wherein the second temperature is in the range of 400° F. to and 700° F.

12. The method of claim 1 wherein the third temperature is in the range of 752° F. to 1100° F.

13. The method of claim 1 including flowing the non-reactive atmosphere over the green salt to carry away liberated water.

14. A method for producing green salt from hydrated green salt comprising:
   heating a charge of hydrated green salt in a non-reactive atmosphere to a first temperature in the range of 212° F. to 400° F. to drive off free water;
   heating the charge in a non-reactive atmosphere to a second temperature in the range of 400° F. to 700° F. to drive off the water of crystallization present in the green salt;
   heating the charge in a non-reactive atmosphere to a third temperature in the range of 752° F. to 1100° F. to induce anhygroscopicity of the charge; and
   cooling the charge to approximately 400° F. or less in a non-reactive atmosphere to prevent oxidation and hydrolysis.

15. The method of claim 14 including heating the charge in a non-reactive atmosphere to a further temperature above 1100° F. before cooling the charge to increase the bulk density of the charge.

16. The method of claim 14 including flowing said non-reactive atmosphere over said charge to carry away liberated water.

17. The method of claim 14 wherein the non-reactive atmosphere during the heating to the first temperature is air.

18. The method of claim 14 wherein the non-reactive atmosphere is a noble gas.

19. The method of claim 14 wherein the non-reactive atmosphere is a vacuum.

* * * * *